April 30, 1935. B. A. WITTKUHNS 1,999,645

POSITIONAL CONTROL OF HEAVY OBJECTS

Filed Sept. 24, 1931  2 Sheets-Sheet 1

INVENTOR
BRUNO A. WITTKUHNS.
BY
Herbert H. Thompson
his ATTORNEY.

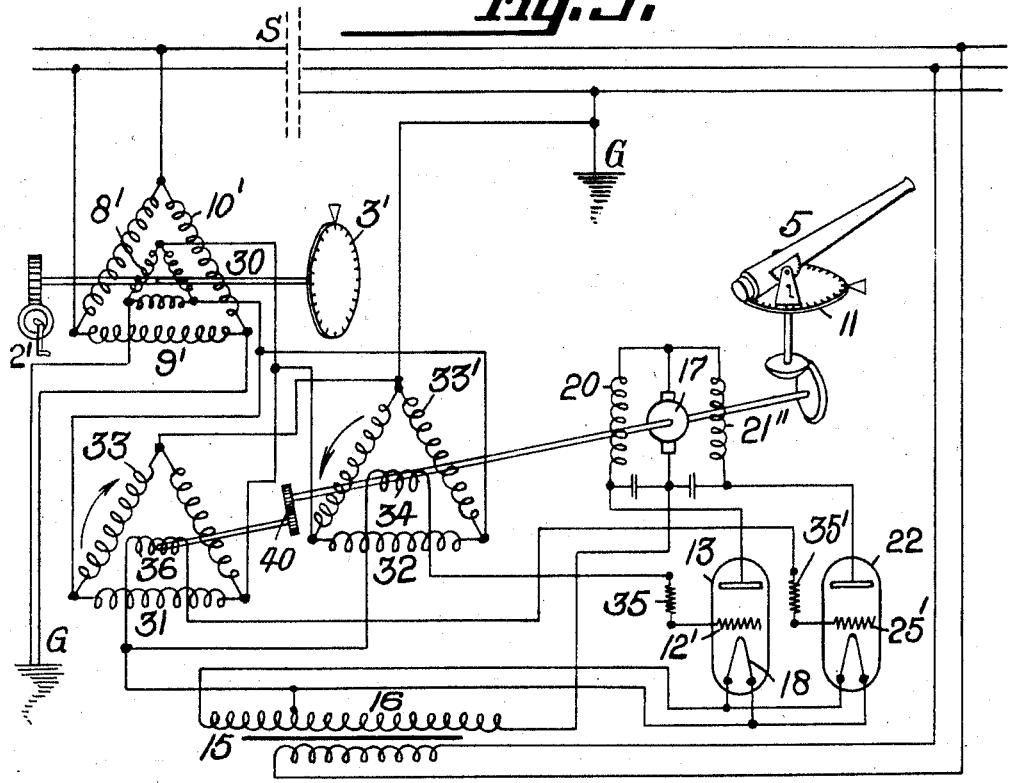

Patented Apr. 30, 1935

1,999,645

UNITED STATES PATENT OFFICE 1,999,645

POSITIONAL CONTROL OF HEAVY OBJECTS

Bruno A. Wittkuhns, Chatham, N. J., assignor to Sperry Gyroscope Company, Inc., Brooklyn, N. Y., a corporation of New York Application September 24, 1931, Serial No. 564,817

13 Claims. (Cl. 172—239)

This invention relates to the positional control of a receiver or other object at a distance in accordance with the position of a sending instrument. According to my invention I propose to control the torque and direction of rotation of a power motor at the receiver from a transmitter at the sending instrument with the use of a minimum amount of current and minimum number of wires. According to my invention also, only one source of supply, preferably an A. C. source, need be provided for operating the transmission system and also the power motor, the latter, however, being preferably of the D. C. type. One important part of my invention lies in the direct actuation of the power motor by a grid-controlled gas or vapor filled rectifier tube or tubes, sometimes referred to as a grid glow tube. According to my invention, the power motor is directly coupled to the output of such a tube while the grid potential is controlled directly from the transmitter without the inter-disposition of any other amplifying units. Other objects of the invention will become apparent as the description proceeds.

Referring to the drawings,

Fig. 3 is a wiring diagram of another modification which in some respects is superior to both of the other two forms.

The sending instrument is indicated generally at 1, the same being shown as rotated from a hand crank 2 to set the dial 3 to any predetermined reading, such as the azimuth bearings of a target. It will be understood that the sending instrument may be merely a dial or it may be a sighting telescope, searchlight or any similar device adapted to be trained on a target or set in accordance with its known bearings. The receiver is shown generally at 4, the controlled object in this instance being illustrated as a gun 5.

Figure 1:
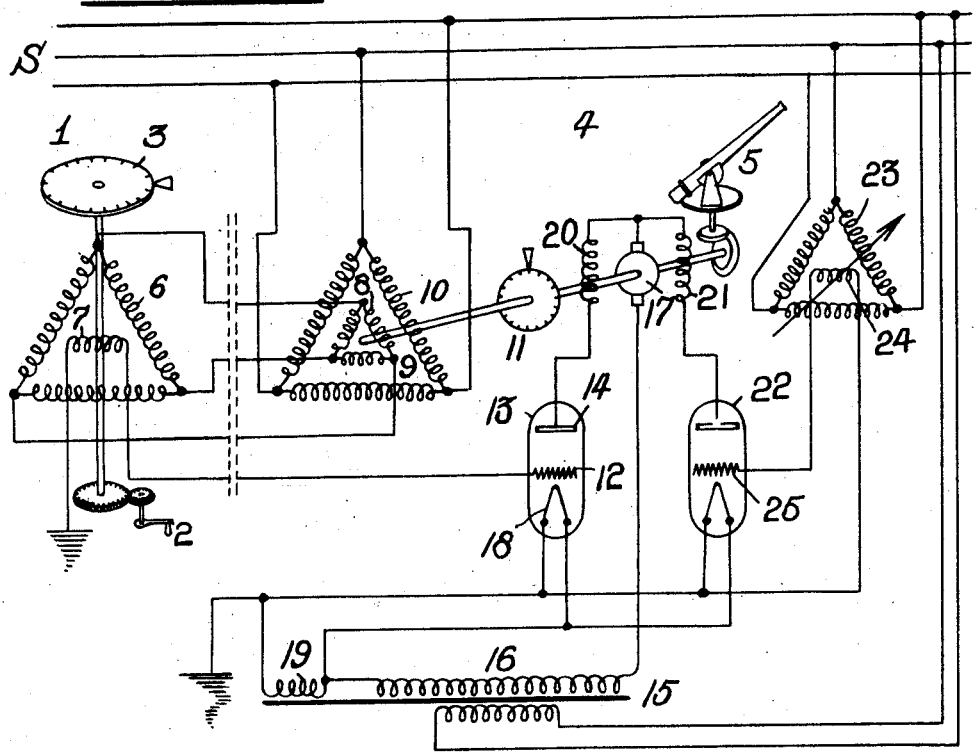
Fig. 1 is a wiring diagram showing one form of the invention.

According to my invention the transmitter at the sending end comprises an inductive device somewhat similar to an A. C. induction transmitter used in self-synchronous transmission systems but with an important difference in the connections and operation. According to my invention I supply three phase current to the stator 6 of said instrument and utilize the single phase output of the rotor 7 to actuate the receiver, while in the ordinary synchronous system, single phase is supplied to the rotor and the single phase three-circuit outputs transmitted to the receiver. Preferably the stator is supplied with three-phase current from the secondary 8 of a variable transformer 9 at the receiver, whereby a follow-back connection from the receiver is secured. The primary 10 of said transformer may be excited directly from the polyphase supply S. The rotary element, in this case the secondary, is shown as rotatable with the receiving dial 11 so that when the receiver is turned the phase output of the secondary 8 will be shifted, thereby shifting the phase angle of the winding 6 in the sending instrument. This will, of course, shift the phase of the output of the secondary 7 in a similar manner to the rotation of said secondary 7 through an equal and opposite angle to the rotation of the secondary 8. It should be observed that according to this system it is not necessary to carry the main supply wires S to the sending instrument so that the entire apparatus to the right of the dotted lines in Fig. 1 may be at the receiving end with only four small wires carrying very small current leading to the sending end. It will also be understood that the gear ratios and load are sufficient at both the sending and receiving end to prevent rotation of the rotors due solely to the inductive drag on the same of the rotating polyphase field.

The output of the coil 7 is connected between the grid 12 and filament 18 of a grid-glow tube 13. Alternating current is preferably supplied to the plate 14 of said tube from a transformer 15, the primary of which is connected to a phase of the main supply S, while the secondary 16 is connected through the power motor 17 to said plate. The filament 18 of said tube may be lighted from an auxiliary secondary 19 on said transformer. The power motor is shown as a reversible D. C. series wound motor, preferably having two opposed field windings 20—21. Winding 20 is shown as in series with a plate 14. Winding 21, on the other hand, in this form of the invention is in series with a fairly constant but adjustable source of E. M. F. so that the winding 21 remains at a predetermined fixed strength. The current through winding 20 on the other hand varies from zero to a maximum, in excess of the current in winding 21 so that when little or no current is passing through the winding 20, the motor is driven at maximum speed in one direction under the influence of the current passing through the winding 21 and the armature, but when maximum current is flowing through winding 20, the effect of the current in winding 21 on the field is overcome, the field reversed and the motor driven at a maximum speed in the opposite direction. It will be obvious that between these two limits the motor may be rotated at any desired speed in either direction or brought to rest when the current through both windings is equal, producing no field.

The variation of current in the coil 20 is produced practically entirely by the variation in the phase of the potential applied to the grid 12 by the winding 7. By selecting a proper phase angle between grid potential and plate potential on the tube, the output of the tube may be varied either up or down in accordance with small changes of phase-angle of the grid potential, the output being in trigonometric proportion to the shift in phase if the balance point is so selected as to represent a phase angle of 90° between grid and plate potential, or the output of the tube may be controlled between two limits, full on in one direction, off, or full on in the other direction, depending on the phase relationships between the grid and anode voltage. If, for instance, the phase relationships are such that a slight shift in the phase of the grid voltage trips the tube substantially at the beginning of each cycle, a very sensitive on and off control will be secured but in which the speed of the motor is not graduated. On the other hand, if the normal relationship is such that a slight phase shift in the grid voltage trips the tube near the end of its cycle and further shifts trip it successively farther from the end of the cycle, a graduated control would be secured to the motor. The output of tube 13 will be, of course, in the form of pulsating direct current (which may, if desired, be smoothed out by usual known means) so that the mean potential impressed on the coil 20 may be varied from zero to a maximum. A more steady flow of current could be obtained, if desired, by employing two tubes in full wave fashion instead of one tube in half wave rectification as shown. It is obvious that the voltage impressed on the coil 21 may be selected at a point between the zero and maximum points of the voltages on coil 20 so that the motor may be run with equal facility and speed in either direction.

For supplying current to the coil 21, I prefer to make use of a second grid-controlled rectifier tube 22, the filament being lighted from the same transformer 19 and the plate being connected to the coil 21, armature 17, and secondary 16 as before. The grid, however, is controlled in this instance from an inductive device which may be similar in structure to the transmitter 6. In this case, however, the polyphase stator 23 is shown as directly excited from the polyphase line while the single phase secondary 24 is connected between the grid 25 and the filament. It will be understood that one winding (as shown the stator 24) is rotatably mounted so that it may be adjusted in position until the proper potential is reached in the coil 21, or in other words, until the zero or standstill point of the motor is adjusted so that equal range of speed may be obtained on each side of the zero point.

Figure 2:
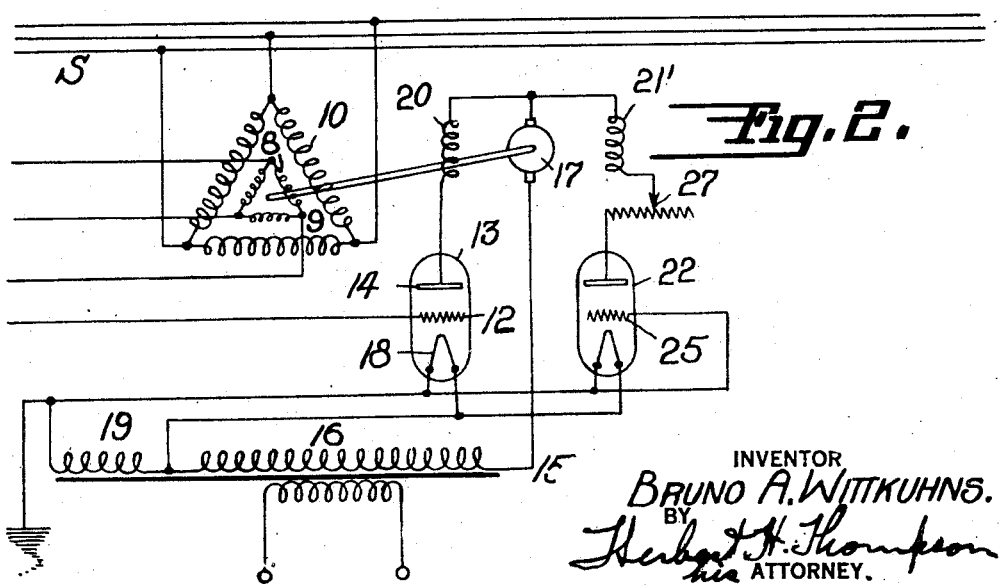
Fig. 2 is a simplified diagram showing a modified form of the receiving end of my invention.

Fig. 2 shows a simplified method of supplying current to the field coil 21' of motor 17. In this form of the invention the inductive device 23 is omitted entirely and the grid-controlled rectifier tube 22 has the grid thereof connected to the grounded side of the filament. The tube, therefore, will supply a constant output to the coil 21 which may in this instance be varied by a variable resistance 27 so as to adjust the zero point of the motor.

A somewhat different form of the invention is shown in Fig. 3 which suggests one of the many modifications of which my invention is susceptible. According to this form of the invention I retain the polyphase, phase-shifting transformer employed in the other figures but place it in this instance at the sending end instead of at the receiving end. I also provide a more sensitive and flexible control of the motor by oppositely varying the E. M. F.'s impressed on the two field windings instead of varying the voltages of only one of the windings. At the sending instrument I have shown the polyphase, phase-shifting adjustable transformer 9' having the primary 10' excited directly from the three phase supply S. Only two wires need be carried back to the sending instrument, however, since the third phase is shown as grounded at G. The rotatable three phase secondary is shown as mounted on a shaft 30 of the indicator 3'. The secondary 8' in this instance is connected to a plurality of inductive devices 31—32 which may be similar in construction to A. C. self-synchronous repeater motors. As shown, said secondary 8' is connected to the three phase stator windings 33—33' in such a manner as to generate three phase fields of opposite rotational sense so that upon turning of the secondary in one direction, the induced single phase potentials will be shifted in opposite directions in the two inductive devices. The single phase rotors of said devices are not connected to a supply as usual in said motors. The winding on rotor 34 of motor 32 is shown as connected between the grid 12' and filament 18 of the grid glow tube 13, through grid current suppressing resistance 35. On the other hand the grid 25' of the tube 22 in this instance is connected to a secondary 36 of the motor 31 through resistance 35'. The output from the plates of the two tubes drives the motor in opposite directions to restore synchronism. For this purpose tube 13 may be connected as before through the opposed field coils of the motor 17 and to the transformer 15, the output of tube 22 being connected to the coil 21'' of the motor 17 and that of tube 13 to coil 20. It will be understood that any other known means employed for reversing a motor from reversible circuits may be employed, if desired. Since the phases induced in the coils 34—36 are in alignment when the controller transformer 9' is stationary and the parts are synchronized, the output of tubes 13 and 22 will be equal so that the motor will stand still, the field coils neutralizing each other. If, however, controller 9' is moved in one direction, the output of one tube will increase while the other will diminish; or upon opposite rotation of the transformer controller the last mentioned tube's output will increase and the first mentioned tube's output decrease, thus driving the motor in the proper direction to restore the secondaries 34—36 (which are oppositely turned from motor 17 through gearing 40) to their synchronized position with the sending instrument. By this means a greater speed range and greater flexibility may be obtained for the motor.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a remote control positional system, the combination with a sending and a receiving instrument, a reversible power motor for driving the latter having opposed reversing windings, a grid glow tube having the output thereof connected to one winding, the other windings being constant, an A. C. supply for said tube, and a transmitter at the sending station adapted to shift the phase on the grid of said tube in accordance with the position thereof.

2. In a remote control positional system, the combination with a sending and a receiving instrument, a reversible power motor for driving the latter, a polyphase, phase shifting transformer at the receiving end and turned from said motor, an A. C. transmitter at the sending end energized from the secondary of said transformer, a grid-glow tube having the grid thereof controlled from the output of said transmitter and the plate connected to said motor, and an A. C. supply for said transformer and tube.

3. In a remote control positional system, the combination with a sending and a receiving instrument, a reversible power motor for driving the latter having opposed windings, a pair of grid-glow tubes having the output of one connected to one winding and the output of the other connected to the other winding, a common A. C. supply for said tubes, a transmitter at the sending station adapted to shift the phase on the grid of one of said tubes in accordance with the position thereof, and means for supplying the grid of the other tube with a potential of fixed phase.

4. In a remote control, self-synchronous positional system, a polyphase, phase-shifting transformer, an inductive device having a polyphase winding excited from the secondary of said transformer and a single phase secondary, said windings being relatively rotatable, a grid-glow tube controlled from said secondary, and a reversible motor actuated in either direction by the output of said tube.

5. In a remote control, self-synchronous positional system, a polyphase, phase-shifting transformer at the sending station, a pair of inductive devices at the receiving station having polyphase windings oppositely excited from the secondary of said transformer and single phase secondaries, said windings being oppositely rotatable, a pair of grid-glow tubes oppositely controlled from said secondaries, and a reversible motor for turning the receiving instrument actuated in either direction by the output of said tubes.

6. Self-synchronous power means for positioning an object in accordance with the position of a sending instrument comprising an inductive device having a polyphase primary and a single phase secondary, one of said windings being rotatable, a polyphase supply for said primary, a grid-glow tube powered from a phase of said supply and having the grid thereof connected to said secondary whereby the output of said tube is governed by the position of the rotatable winding of said device, a servo-motor actuated by the output of said tube for turning the object and a second inductive device having a polyphase primary excited from said supply and a polyphase secondary, the latter being connected to the polyphase primary of the first named device and one of said devices being driven from the sending instrument and the other from the object.

7. Self-synchronous power means for positioning an object in accordance with the position of a sending instrument comprising an inductive device at the sending instrument having a polyphase primary and a single phase secondary, one of said windings being rotatable with said instrument, a grid-glow tube powered from a phase of said supply and having the grid thereof connected to said secondary whereby the output of said tube is governed by the position of the rotatable winding of said device, a servo-motor actuated by the output of said tube for turning the object, and a follow-back connection between the motor and device including a transformer for supplying the polyphase current to the primary of said device, said transformer having a winding turnable with said motor.

8. In a remote control positional system having a sending and a receiving instrument, a reversible direct current motor for driving the latter, a three phase supply, a grid-glow tube for supplying direct current to said motor, and means for governing both the direction and amount of rotation and also the torque of the motor including an inductive transmitter and inductive receiver devices powered from said supply, one of said devices having a single phase secondary connected to the grid of said tube for varying the phase on the grid of said tube in accordance with the relative positions of the two devices, and means for supplying said motor with a counter E. M. F. tending to drive it in the opposite direction to said tube output, one of said devices being driven from the sending instrument and the other from the receiver.

9. In a remote control, self-synchronous positional system, a polyphase, phase-shifting transformer at the receiver and turned therefrom, an inductive device at the sending instrument having a polyphase winding excited from the secondary of said transformer and a single phase secondary, said windings being relatively rotatable at will, a grid-glow tube controlled from said secondary, and a reversible motor actuated in either direction by the output of said tube for driving the receiver.

10. Means for driving a driven object into positional agreement with the sending instrument comprising an inductive device at the sending station having a three-phase primary and a single phase secondary winding, said windings being relatively rotatable, an electronic tube device governed by the output of said secondary, a reversible driving motor for turning said driven object and controlled from said tube device, and a follow-back drive from said motor to said sending instrument including a three-phase phase-shifting transformer having the primary and secondary relatively rotated by said motor, said secondary supplying current for the primary of said inductive device.

11. Means for driving a driven object into positional agreement with a sending instrument comprising a three phase transformer at the sending instrument, having one part rotatable with said instrument, a pair of inductive devices connected to the driven object having three phase primaries oppositely connected to the secondary of said transformer, and single phase secondaries, a pair of grid glow tubes, a reversible power motor driven in opposite directions by the output of said tubes, said single phase secondaries being connected to the grids of said tubes to oppositely shift the phase on the grids thereof upon rotation of the sending instrument.

12. In a remote control positional system, the combination with a sending and a receiving instrument, a reversible power motor for driving the latter, a pair of grid-glow tubes having the output of one connected to drive the motor in one direction and the output of the other connected to drive said motor in the other direction, a transformer transmitter at the sending station, a pair of A. C. inductive devices at the receiver powered from said transformer transmitter and having single phase secondaries connected to oppositely shift the phase on the grids of said tubes upon rotation of the sending instrument, and a three phase supply for said transformer transmitter, one phase of which is also used for said tubes.

13. In a remote control positional system, the combination with a sending and a receiving instrument, a reversible power motor for driving the latter having opposed windings, a pair of grid-glow tubes having the output of one connected to one winding and the output of the other connected to the other winding, a transmitter inductive device at the sending station and a receiver inductive device at the receiving station, each having a three phase winding, one of which windings on one device is connected to the supply and said winding on the other device to a secondary three phase winding on the first named device, said second device having a single phase secondary connected to the grid of at least one of said tubes to shift the phase thereon in accordance with the relative position of the two devices, and a common three phase supply for said devices, one phase of which is also taken to supply said motor and tubes.

BRUNO A. WITTKUHNS.